United States Patent [19]

Gilbert et al.

[11] Patent Number: 4,828,435
[45] Date of Patent: May 9, 1989

[54] DISPERSING PARTICULATE MATERIAL IN A STREAM OF GAS

[75] Inventors: Richard Gilbert; Yvon Perron, both of Jonquiere, Canada

[73] Assignee: Alcan International Limited, Montreal, Canada

[21] Appl. No.: 151,563

[22] Filed: Feb. 2, 1988

Related U.S. Application Data

[63] Continuation of Ser. No. 828,150, Feb. 10, 1986, abandoned.

[30] Foreign Application Priority Data

Feb. 11, 1985 [CA] Canada .................................. 473996

[51] Int. Cl.$^4$ ...................... B65G 53/52; B65G 53/40; B01D 53/06
[52] U.S. Cl. ...................................... 406/92; 406/108; 406/144; 406/191; 55/71; 55/262
[58] Field of Search ............... 406/122, 108, 144, 153, 406/92, 86, 191, 197; 55/71, 74, 262, 390

[56] References Cited

U.S. PATENT DOCUMENTS

| | | | |
|---|---|---|---|
| 1,243,892 | 10/1917 | Strong | 406/108 |
| 1,292,004 | 1/1919 | Miller | 406/144 X |
| 1,754,121 | 4/1930 | Sammis | 406/108 X |
| 2,391,048 | 12/1945 | Vose | 406/144 X |
| 3,245,725 | 4/1966 | Wildman, Jr. | 406/108 |
| 3,596,805 | 8/1971 | Farmery | 406/144 X |
| 4,042,667 | 8/1977 | Ishiwata et al. | 55/71 X |
| 4,462,777 | 7/1984 | Watanabe et al. | 406/92 X |
| 4,501,599 | 2/1985 | Loukos | 55/71 |

FOREIGN PATENT DOCUMENTS

31034 1/1923 Denmark ........................... 406/191

*Primary Examiner*—Joseph F. Peters, Jr.
*Assistant Examiner*—James M. Kannofsky
*Attorney, Agent, or Firm*—Cooper & Dunham

[57] ABSTRACT

Equipment for dispersing particulate material in a stream of gas comprises a duct to contain the stream of gas, a bluff body mounted and extending transversely within the duct to create turbulence in the gas stream, and means for introducing particulate material immediately upstream and/or downstream of the bluff body, whereby the material becomes uniformly entrained in the gas stream. The invention is of particular value for introducing alumina for dry scrubbing of HF-containing exhaust gases from aluminum electrolytic reduction cells.

6 Claims, 7 Drawing Sheets

DISPERSING PARTICULATE MATERIAL IN A STREAM OF GAS

This application is a continuation of applicants' co-pending U.S. patent application Ser. No. 828,150, filed Feb. 10, 1986, for "Dispersing Particulate Material in a Stream of Gas", now abandoned.

The present invention relates to the injection and uniform dispersion of particulate solids in gas stream, flowing in duct.

It especially relates to the injection and uniform dispersion of particular scrubbing media in a duct for the dry scrubbing of gases and more especially to the injection and uniform dispersion of alumina in the exhaust duct for the dry scrubbing of the waste gases from electrolytic reduction cells for the production of aluminium. The off-gases from the latter process contain HF and other fluorine compounds which must be reduced to a very low value before the off-gases can be discharged to atmosphere.

Although great success has been achieved in the development of dry scubbing processes in which the off-gases are contacted with dry cell feed alumina to adsorb HF and return it to the reduction cells, there are ever more stringent environmental requirements with regard to the permissible a HF content of gas discharged to atmosphere.

In one known dry scrubbing system the off-gas or primary gas from a group of electrolytic reduction cells is collected and forwarded at high velocity through an essentially horizontal duct. Alumina is injected into the gas stream and is carried forward into one or usually several bag filter houses arranged in parallel, in which the alumina particles are separated from the gas. The thus separated alumina is generally in part forwarded to the cells as feed and in part recirculated to the dry scrubbing inlet duct.

The alumina adsorbs HF gas whilst in the system both the flight from the point of injection to the filters and while supporting on the filter bags.

In this system the alumina is normally injected into the top of the scrubber inlet duct to form a falling curtain of particles. The residence time of the particles in flight in the duct is normally within the range of one to five seconds.

It would require an upstream relocation of the alumina injection point to achieve a longer residence time for the particles. Space considerations however often preclude this expedient.

With the very large volumes of gas to be handled and the consequent high gas speed in the duct, the injected particles tend to be swept away at their point of entry into the duct with the result that there tends to be an uneven distribution of alumina particles in the primary gas both within the duct and between the parallel baghouses comprising the filter system.

One subject of the present invention is to attain an improvement in the distribution of the alumina particles in the stream of primary gas without requirement of any moving parts in the gas stream, with a view of achieving a further reduction in the HF content of the scrubbed gas.

The invention provides equipment for dispersing particulate material in a stream of gas, comprising a duct to contain the stream of gas, a bluff body mounted and extending transversely within the cut, and means comprising an inlet port for introducing particulate material into the duct immediately upstream and/or downstream of the bluff body.

The term "bluff body" is herein defined as an object which, when introduced into a streamlines flow of gas, promotes a rapidly increasing downstream pressure gradient in the streamline flow around it. The bluff body is believed to function as a turbulence inducer in the gas stream, the streamline flow breaking loose from the surface of the body on either side, creating a downstream turbulent zone associated with quiescent zones both immediately upstream and downstream of itself. These zones may be identified as the "stagnation" and "wake" zones respectively, i.e., the terminology associated with amoving boat.

As noted, this invention is particularly concerned with dispensing powdered alumina in a stream of waste gas. Although the following description is mainly directed to this particular embodiment, it should be understood that the invention is of more general application.

In the absence of the bluff body, particulate material introduced through the inlet port is likely to become non-uniformly dispersed in the gas stream. The purpose of the bluff body is to improve the uniformity of dispersion. The bluff body preferably extends diametrically across the duct, either the whole way across or else a substantial proportion, e.g. at least 40%, of the way across. The cross-sectional area of the bluff body, expressed in a plane perpendicular to the direction of gas flow, should be rather small, preferably no more than 20%, in relation to the cross-sectional area of the cut. The width of the bluff body, expressed in the same place should be less than its length, and may suitably be not more than 25%, preferably from 5% to 15%, of the diameter of the duct. The bluff body may be of constant cross-section or may taper along its length. It may, but need not, include holes in the direction of the gas stream. Preferred designs are rather different depending on whether the duct is horizontal or vertical or inclined.

In a preferred embodiment, the particulate material is injected through the inlet port into the top of an essentially horizontal duct in a confined zone immediately upstream, or downstream, of a bluff body mounted at the top of the cut. The bluff body is positioned vertically within the duct (i.e. perpendicular to the gas flow), in which it extends across about one half to five eighths of the vertical diameter. A bluff body preferred in the embodiment may be fabricated from a tube by removing about one half of the circumference of the wall along part or all of the vertical portion within the duct, and tapering the remaining material in a downward direction.

As the particulate material descends, the particles are progressively exposed to the force of the gas stream at at least one edge of the bluff body, but preferably both edges such that they acquire the velocity of the gas stream and are progressively carried away from the injection point. The downstream turbulence aids mixing of solids and gas. The wake behind the bluff body is believed to expand relative to the axis of the duct, hence gas and solids are fairly well mixed about 1 to 2 m downstream from the injector.

There appears to be a difference in the mode of dispersion of the particulate material in a horizontal duct according to whether it is introduced immediately downstream or upstream of the bluff body. With downstream feed, a portion of the particulate material enters the quiescent wake zone where there is a relatively low fluctuating gas velocity, such that gravitational force may cause the particulate material to form a deposit in the bottom of the duct underneath the bluff body.

The amount of the deposit depends on the following factors:
1. The shape of the bluff body.
2. The position of the bluff body; extent of penetration into the duct.
3. Gas flow rate in the duct; decreasing flow rate increases the amount.
4. Feed rate of particulate material; increasing feed rate increases the amount.
5. Granulometry of particulate material; increasing the proportion of coarse particles increases the amount.

For any given bluff body, particulate granulometry and gas flow rate there is a specific particulate feed rate which has to be attained or exceeded before deposition will occur. The deposit causes a partial restriction of the gas duct which locally increases the turbulence in the duct and increases resistance to gas flow. The result is that the pile acquires a substantially constant equilibrium profile, from which particles are drawn off at an equal rate to the rate of addition of particles from the descending stream.

When particulate material is injected immediately upstream of the bluff body, the flow pattern of the solids is less readily foreseen. It is believed that material introduced into the stagnation zone is drawn into the gas stream at a faster rate during its descent because it is exposed to the high velocity gas stream. Forces causing entrainment of particulate material exceed gravitational force such that formation of a deposit on the bottom of the duct does not occur.

In the preferred embodiment of the invention, an accumulation of material is allowed to form in the bottom of a horizontal duct, and particulate material is introduced downstream of the bluff body to produce such an accumulation.

The maximum width of the bluff body may be quite small in relation to the diameter of the duct, it is preferably positioned to extend at least to the centre of the duct. Dispersion of particulates in the gas at the inclined side edge or edges of the bluff body occurs smoothly and continuously from the point of entry into the duct to a location beyond the centre of the duct.

In another embodiment of the invention, the duct has a vertical axis which the gas stream arranged to flow upwards. In this case it would also be possible to use a tapered bluff body extending part way across the duct. However, this is not preferred because the body would then be in a substantially horizontal position supported structurally at one end only. It is then preferred to provide a body extending the whole way across the duct so that it is supported at both ends. Particulate material is introduced on the immediate downstream side, which in the case of an upwardly flowing gas stream would be on the upper side of the bluff body.

Whilst the body may be tapered, for ease of fabrication it is preferred to use a parallel sided body in the bottom of which holes are provided at intervals through which gas flows to disperse the particulate material within the duct. Such a duct can conveniently take the form of an upwardly open chute which may be fabricated from a tube by removing about half the circumference of the wall along part or all of its length within the duct. The chute is preferably inclined to the horizontal at an angle sufficient for particulate material introduced via the inlet port of flow readily down it, an angle of 20° to 60° to the horizontal is suitable.

This invention results from applicants' discovery that more effective dry scrubbing of HF-containing exhaust gases is achieved when a bluff body is used for introduction of alumina in place of the conventional curtain. The reasons for this are only partially understood. Applicants put forward two alternative theories, but do not wish to be bound by either. One postulates that improved dispersion of the alumina sorbent within the HF-bearing exhaust gas in the duct increases the amount of scrubbing taking place therein before the alumina-laden gas reaches the bag filters. For this to occur the rate of sorbtion of HF by the alumina would have to be significantly faster than the rate of effective diffusion of HF within the duct. If the rate of sorbtion is significantly slower then it does not matter where the alumina is provided that the particles are well separated in the gas, in which case a second theory would apply. This postulates that better alumina dispersion within the gas results in more uniform distribution of alumina between the baghouses to which the gas is led, and thereby increases the amount of scrubbing effected by alumina deposited on the surface of the filter bags.

Reference is directed to the accompanying drawings, in which

FIG. 1*a* is an axial cross-section through prior art equipment including a curtain injector;

FIG. 1*b* is a cross-section on the line A—A;

FIGS. 2*a* and 2*b* are corresponding views of equipment according to this invention including a bluff body and means for injecting alumina immediately downstream thereof;

FIGS. 3*a* and 3*b* are corresponding views of equipment according to this invention in which alumina is injected immediately upstream of the bluff body;

FIGS. 4*a* and 4*b* are top and side views of a typical bluff body for use in the invention;

FIGS. 5*a* to 5*g* are cross-section views corresponding to FIGS. 1*b*, 2*b* and 3*b* showing the effects of using different bluff bodies;

FIG. 6*a* is a plan view of equipment according to the invention including a bluff body mounted in a vertical duct;

FIG. 6*a* is a front view of the line A—A; and

FIG. 7 is a flow diagram of the dry scrubbing equipment for a bank of aluminium electrolytic reduction cells.

Referring to the drawings:

FIGS. 1*a* and 1*b* show a duct 10 having an internal diameter of 2740 mm along which exhaust gases from a bank of aluminum electrolytic reduction cells are passing (from left to right in FIG. 1*a*) at a rate of 20 meters per second. A three-quarter curtain injector 12 is mounted at the top of the duct. Through this, powdered alumina is being injected into the duct and is being entrained in the exhaust gases and carried away as shown at 14. It should be noted that the alumina is confined to the top region of the duct, and does not become uniformly dispersed in the exhaust gases.

FIGS. 2*a* and 2*b* show the same duct 10 as in FIG. 1. Instead of the three-quarter curtain injector, a bluff body 16 is mounted in the top of the duct and extends vertically downwards for a distance just over half the diameter of the duct. An inlet port 18 for alumina is located in immediately downstream of the bluff body. Through this, alumina is injected in a confined zone in the wake of the bluff body, and has become entrained in the exhaust gases at 14. A pile of alumina 20 has formed at the bottom of the duct. Under constant conditions of operation, this pile has an equilibrium profile with a maximum height of approximately 1400 mm and a total length of approximately 4650 mm, of which approximately 3000 mm is downstream of the bluff body 16.

The bluff body 16 has been fabricated from a tube of which part of the circumference has been cut away, the remainder being tapered downwardly from a position adjacent the top of the duct. The open side of the tube faces downstream, and thus acts to some extent as a shield for the injected alumina. The bluff body is illustrated in FIGS. 4a and 4b and is described in more detail below.

Figure 1A:
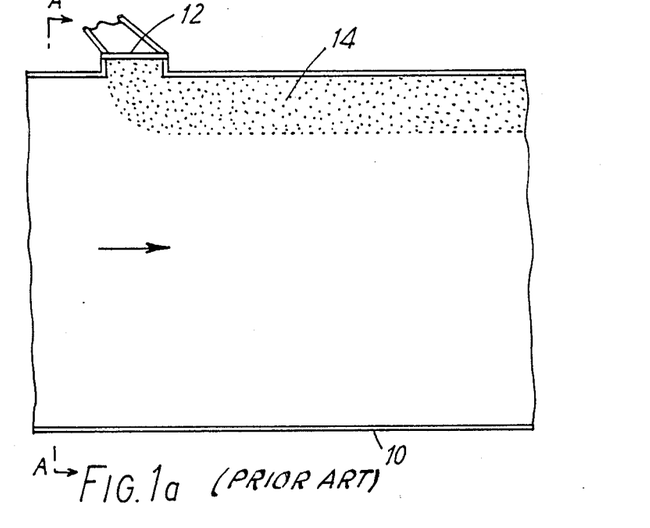
Figure 1B:
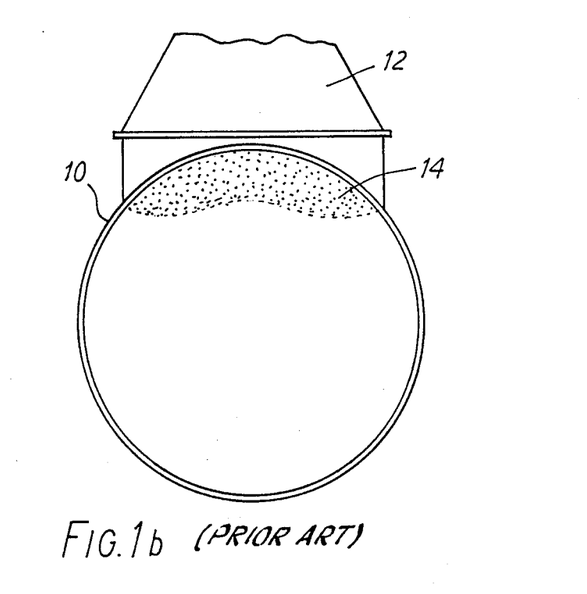
Figure 2A:
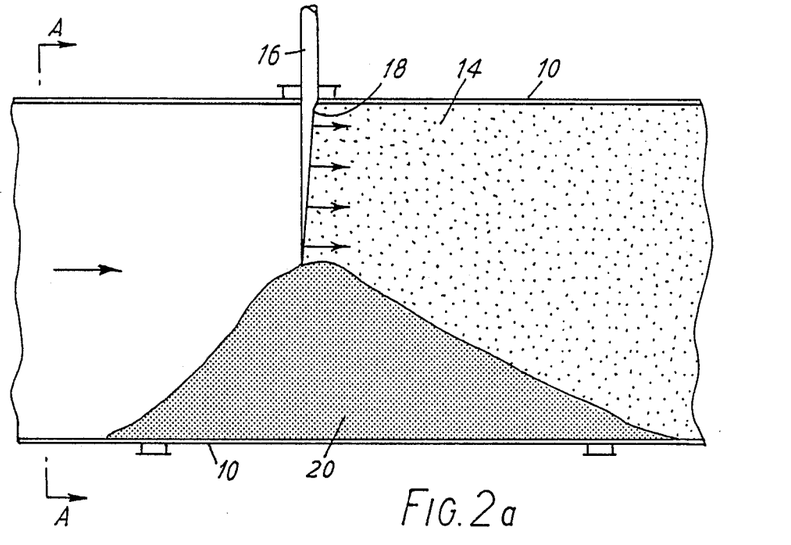
Figure 2B:
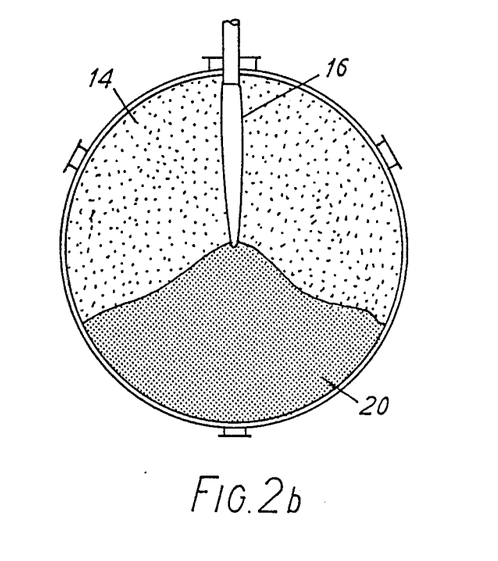
Figure 3A:
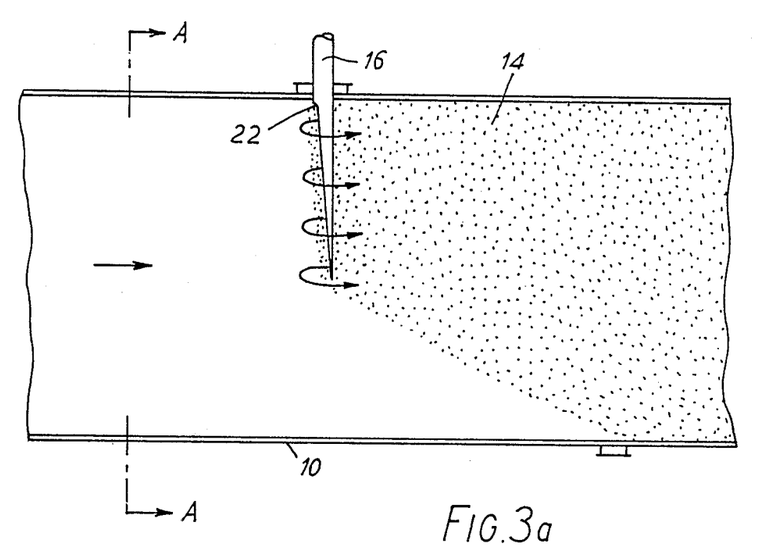
Figure 3B:
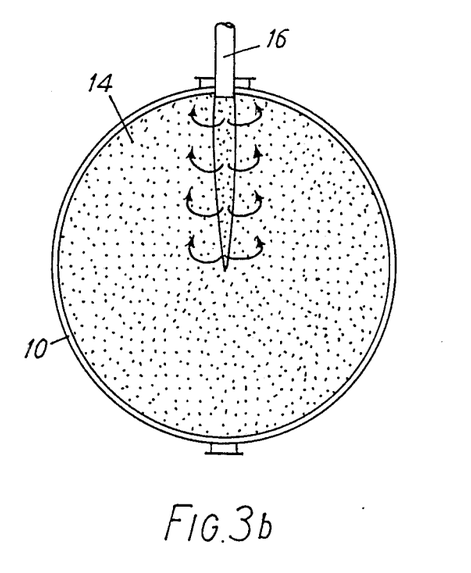

FIGS. 3a and 3b show the same duct 10 as in FIGS. 1 and 2. A bluff body 16 is mounted in the roof of the duct and extends vertically down from it. This is the same bluff body as in FIG. 2, but it has been turned round so that the open side now faces upstream. An inlet port 22 is provided, through which powdered alumina is injected into the confined stagnation zone immediately upstream of the bluff body. The alumina becomes uniformly entrained in the exhaust gases as shown at 14. In this case, unlike FIG. 2, no pile forms on the floor of the duct.

Figure 4A:
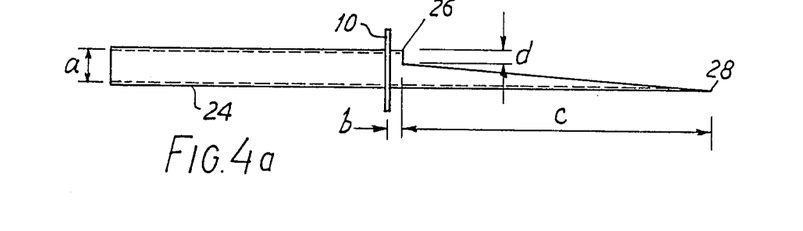
Figure 4B:
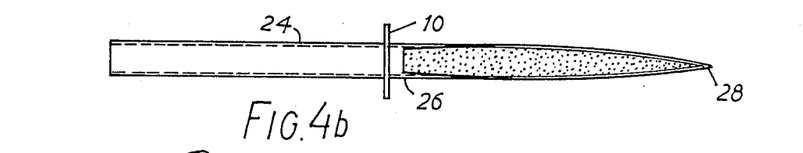

FIGS. 4a and 4b are two views of a typical bluff body such as those used in the embodiments shown in FIGS. 2 and 3. FIG. 4a is a side view and FIG. 4b is a front (or back) view looking along the duct at the open side of the body. The wall 10 of the duct is shown, and the bluff body within the duct is to the right of that wall in the Figures.

The bluff body is fabricated from a tube 24 having a diameter a. Part of the circumference of the tube has been cut away from a point 26 within the duct to the end 28 of the body. The distance from point 26 to the duct wall 10 is given as b. The tube is progressively tapered from 26 to a point at 28. The distance between points 26 and 28 is given as c. The extent to which the circumference of the tube is not away at point 26 is given by the distance d. As can be seen, the bluff body has a shape resembling a pen nib or spatula.

Various bluff bodies generally as illustrated in FIG. 4 were made and tested in the aforesaid duct having a diameter of 2740 mm. Details of these are set out in the Table below, in which a, b and c are expressed in mm and d is expressed as a fraction of a.

| Bluff Body | a (mm) | b (mm) | c (mm) | d/a |
| --- | --- | --- | --- | --- |
| 1 | 152 | 864 | 1219 | 0 |
| 2 | 152 | 203 | 1880 | 0.18 |
| 3 | 152 | 152 | 1219 | 0 |
| 4 | 152 | 51 | 1524 | 0.33 |
| 5 | 152 | 51 | 1981 | 0.32 |
| 6 | 203 | 51 | 1524 | 0.33 |
| 7 | 102 | 51 | 1524 | 0.33 |
| 8 | 254 | 51 | 1524 | 0.5 |
| 9 | 305 | 51 | 1524 | 0.5 |
| 10 | 152 | 51 | 1219 | 0.5 |
| 11 | 203 | 51 | 1524 | 0.5 |
| 12 | 152 | 51 | 1524 | 0.5 |
| 13 | 457 | 51 | 1524 | 0.5 |
| 14 | 610 | 51 | 1524 | 0.5 |
| 15 | 152 | 51 | 1524 | 0.79 |

FIGS. 5a to g are cross-sections similar to that of FIG. 2b, but in the opposite direction, i.e. looking upstream at a bluff body in a horizontal duct. The Figures show that effects on alumina distribution of using various bluff bodies listed in the preceding Table.

Figure 5A:
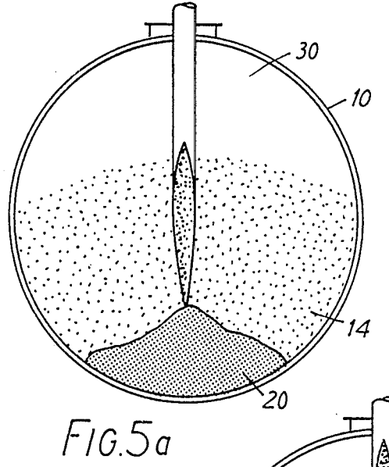

FIG. 5a shows the effect of using bluff body 1 A small pile of alumina 20, of maximum height 670 mm, has formed at the bottom of the duct 10. The bulk of the injected alumina is shown entrained at 14 in the exhaust gases. But the dispersion is not completely uniform, for a region 30 exists near the top of the duct where no alumina is present.

Figure 5B:
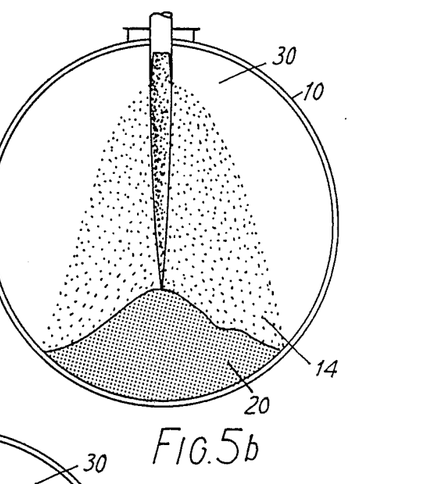

FIG. 5b shows the effect of using bluff body 2. The pile as maximum height of 900 mm.

Figure 5C:
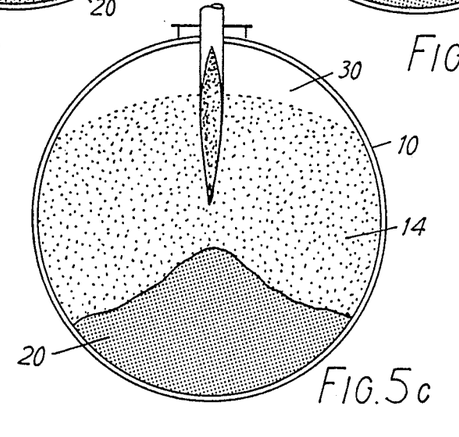

FIG. 5c shows the effect of using bluff body 3. The pile has a maximum height of 1220 mm.

Figure 5D:
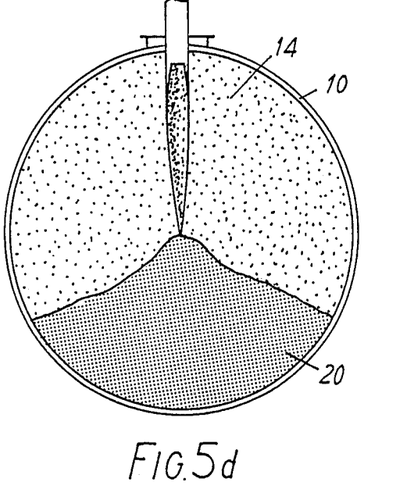

FIG. 5d shows the effect of using bluff body 4. The pile has a maximum height of 1400 mm. There is no region of the cut where powdered alumina is not entrained. This is the presently preferred design of bluff body.

Figure 5E:
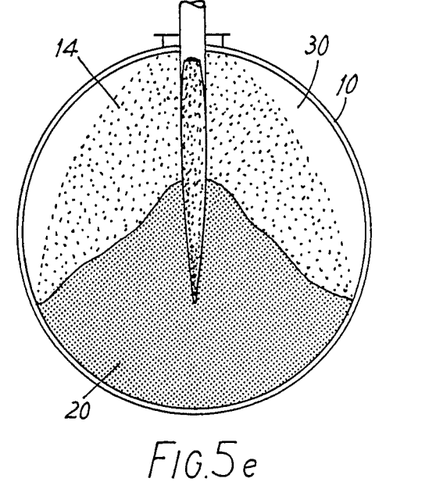

FIG. 5e shows the effect of using bluff body 5. The pile has a maximum height of 1900 mm.

Figure 5F:
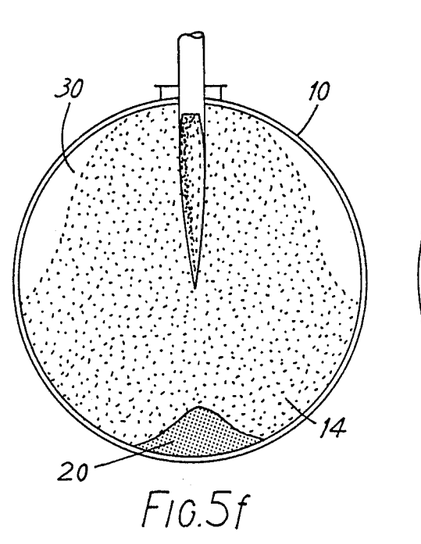

FIG. 5f shows the effect of using bluff body 6. The pile has a maximum height of 400 mm.

Figure 5G:
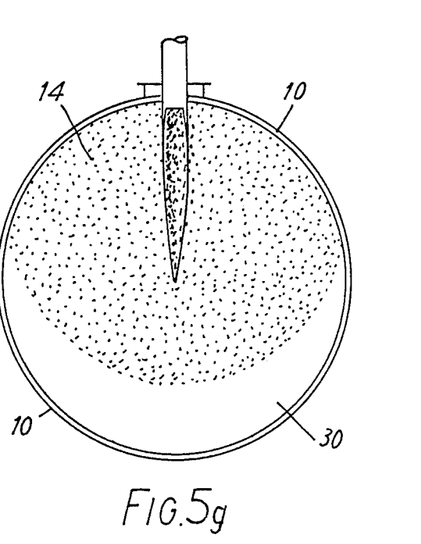

FIG. 5g shows the effect of using bluff body 12. No pile is formed, and there is a region towards the bottom of the cut where alumina is not entrained in the exhaust gases.

Figure 6A:
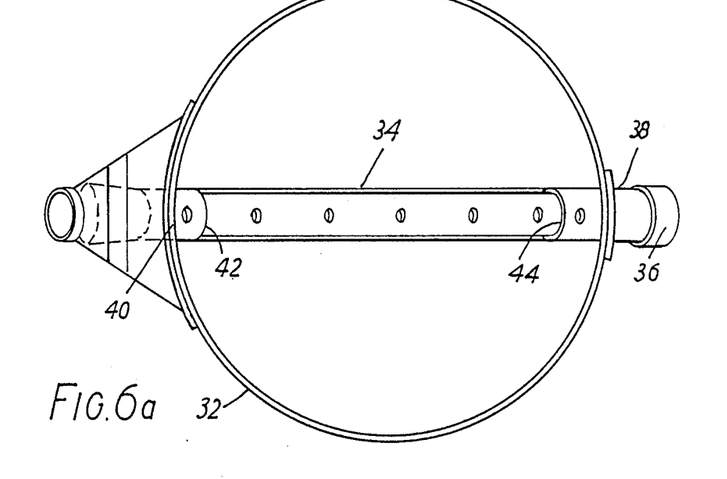
Figure 6B:
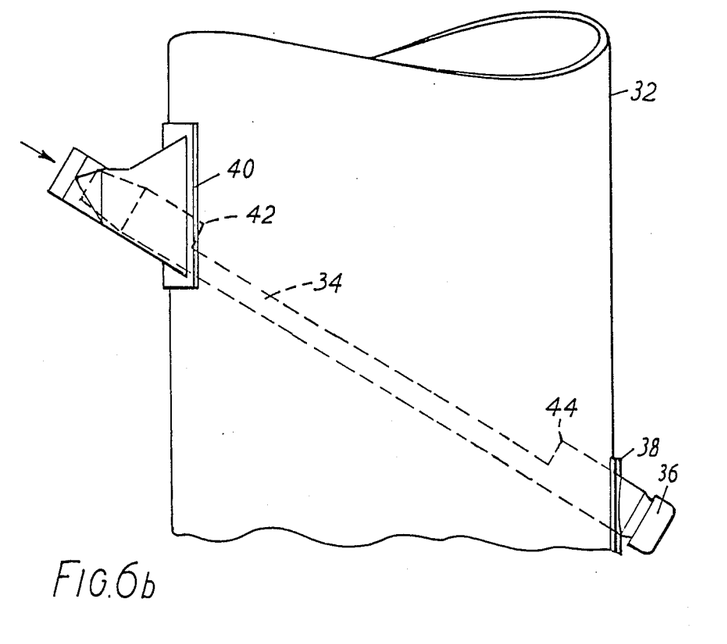

FIGS. 6a and 6b show a different embodiment of the invention. A vertical duct 32 has diameter 1372 mm, and the gas flow is upwards. A bluff body 34 extends diametrically across the duct as an angle of 30° to the horizontal. The bluff body is fabricated from a pipe of diameter 152 mm, closed at its lower end 36, and welded into the duct at 38 near its lower end. The pipe extends through the duct at 40, and this constitutes an inlet port for the alumina. Between points 42 and 44 within the duct, the upper half of the circumferences of the pipe is cut away to leave an inclined chute. Spaced along the bottom of this chute at intervals of 254 mm are seven holes of diameter 18mm. In operation, alumina is injected into the duct at 40, passes down the chute constituted by the open part of the bluff body 34 and becomes uniformly entrained in the upward flow of exhaust gases.

Figure 7:
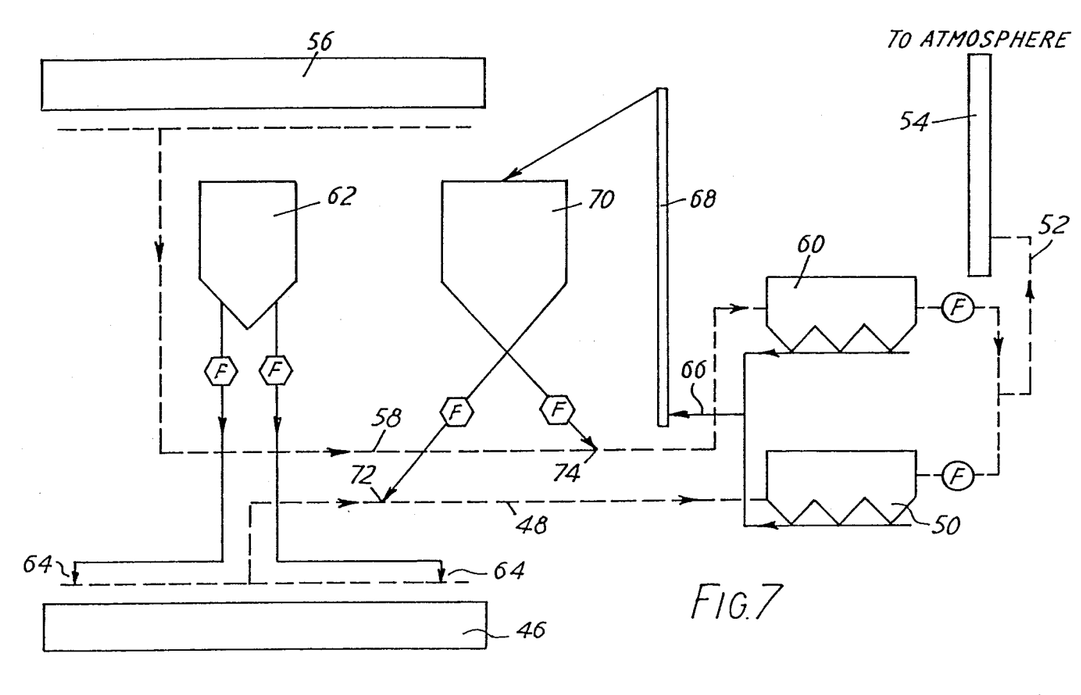

In the flow diagram of FIG. 7, the flow of HF-containing exhaust gases is shown as a dashed line and the flow of alumina for dry scrubbing is shown as a continuous line.

A first row of aluminum electrolytic reduction cells 46 generate HF-containing exhaust gases which are passed along a duct 48 to baghouses 50 where most of the HF is removed. The exhaust gases, now largely freed of HF, are collected and passed via duct 52 to stack 54 and thence to the atmosphere. Similarly, exhaust gases from a second row of cells 56 are passed via line 58 to baghouses 60, the cleaned gases similarly being passed via duct 52 and stack 54 to the atmosphere.

Fresh alumina is supplied from a storage tank 62 by conventional means to points 654 at the upstream end of the duct 48. There, the alumina is entrained in the exhaust gases from the cells 46 and carried by the exhaust gases to the baghouses 50. Having performed its dry scrubbing function, the alumina is recycled via line 66 and elevator 68 for storage in another silo 70. Recycle alumina from the silo 70 is injected at points 72 and 74 into the ducts 48 and 58 carrying exhaust gases, the injections at these points being performed using bluff bodies according to the present invention. Alumina entrained in the exhaust gases in line 48 passes to the baghouses 50, from which it is collected and recycled via lie 66 and elevator 68 to silo 70. The supply of fresh and recycle alumina to injection points 64 and 72 is adjusted so as to provide for the dry scrubbing requirements of the duct 48. The supply of fresh alumina to the duct 58 (not shown) and recycle alumina to point 74 is adjusted to provide for the dry scrubbing requirements of the duct 58. Surplus recycle alumina from silo 70 is removed and used as feedstock for other alumina electrolytic reduction cells.

The following Examples illustrate the invention.

EXAMPLE 1

This example describes experiments carried out in the equipment shown in FIG. 7. The ducts 48 and 58 each had an internal diameter of 2900 mm. The flow rate of the gas was about 5,500 $Nm^3$/min so that the linear gas velocity was approximately 14 m/sec. The injection points 72, 74 are both positioned 15 m upstream of the baghouses 50, 60 given a gas/particle in-flight contact time of about 1 sec. 4.8 tonnes per hour of fresh alumina were injected by conventional means at points 64. 15 tonnes per hour of recycle alumina were injected into duct 48 at point 72.

In the comparative example, a three-quarter curtain injector, as illustrated in FIG. 1a and 1b, was used at point 72. Under these conditions, the average hydrogen fluoride content of the gases in the exhaust duct from the line of reduction cells 46 was 92 mg/$Nm^3$. The HF content of the gases emerging from the baghouses 50 was averaging 15. Omg/$Nm^3$ corresponding to an HF scrubbing efficiency of 83.7%.

The experiment involved replacing the three-quarter curtain injector at point 72 by a bluff body of the kind illustrated in FIGS. 4a and 4b, specifically, the preferred bluff body No. 4 with the open side facing downstream. As a result of this change, the HF content of the gases emerging from the baghouses 50 fell to 2.4 mg/$Nm^3$. The HF content of the raw exhaust gas had also fallen to 74 mg/$Nm^3$, but there was still an overall improvement in scrubbing efficiency to 96.7%. Statistical evaluation of the test results showed the improvement to be significant at the 99% level.

Measurements made at various locations within the duct 12 meters downstream of the injection points also showed striking differences. With the three-quarter curtain injector, the entrained alumina concentration varied substantially over the cross-section of the duct, and in particular was almost zero near the bottom of the duct. With the bluff body injectors, the entrained alumina concentration was substantially constant, both from top to bottom and from side to side of the duct.

EXAMPLE 2

Further experiments were carried out in the plant illustrated in FIG. 7 in which the amount of recycle alumina injected into the duct 48 at point 72 was increased to 25 tonnes per hour. The HF content of the exhaust gas was reduced from 94 to 6.0 mg/$Nm^3$ when feed alumina was introduced to the duct using the three-quarter curtain injector, corresponding to an HF scrubbing efficiency fo 93.6%. Replacing the injector with bluff body No. 4 with the open side facing downstream, resulted in a reduction in the HF content of the exhaust gas from 104 to 2.8 mg/$Nm^3$. This corresponded to an improved HF scrubbing efficiency of 97.3% significant at the 99% level.

EXAMPLE 3

This example described experiments to demonstrate the effect of deposition of alumina on the bottom of the exhaust duct on HF content of clean gases emerging from the baghouses. The experiments were carried out in an installation substantially similar to that illustrated in FIG. 7, with 6.3 mt/h of fresh alumina and 27 mg/h recycle alumina being introduced together both at points 72 and 74. Point 72 was positioned 25 meters upstream of the baghouses 50 whilst 74 was 55 meters upstream of baghouse 60. The injector comprised the preferred bluff body No. 4 alternately orientated with its open end facing downstream, to generate alumina deposition, and upstream, with no deposition. Each test was 30 minutes duration. Results are presented in the table below:

| No. of tests | Position of Injector | Orientation of injector | Average HF Contents of Clean Gas mg/$Nm^3$ | Standard Deviation |
|---|---|---|---|---|
| 277 | 25 m upstream | Downstream (deposition) | 0.63 | 0.08 |
| 212 | 25 m upstream | Upstream (no deposition) | 2.78 | 0.41 |
| 197 | 55 m upstream | Downstream (deposition) | 0.29 | 0.03 |
| 243 | 55 m upstream | Upstream (no deposition) | 1.32 | 0.18 |

The results show a significant advantage in favour of downstream orientation of the injector with deposition of alumina.

We claim:

1. A method of dispersing particulate material in a stream of gas, which method comprises passing the stream of gas along a generally horizontal duct, mounting a bluff body towards the top of the duct and extending transversely within the duct and introducing particulate material into the duct on the down stream side of the bluff body, wherein the shape and position of the bluff body are chosen, in relation to the flow rate of the stream of gas and the feed rate and granulometry of the particulate material, to generate and maintain a pile of the particulate material on the bottom of the duct beneath the bluff body.

2. A method according to claim 1, wherein said particulate material comprises alumina and said stream of gas is a stream of exhaust gases from aluminium electrolytic reduction cells.

3. A method according to claim 1, wherein the bluff body is mounted at the top of the duct and extends down for a distance equal to at least 40% of the diameter of the duct.

4. A method according to claim 3, wherein the bluff body has a length of from one half to five-eighths of the diameter of the duct, and a width of from 5% to 15% of the diameter of the duct.

5. A method according to claim 1, wherein the bluff body is fabricated from a tube by removing about one-half of the circumference of the wall along part or all of the portion within the duct.

6. A method according to claim 5, wherein the bluff body is tapered in a direction away from the inlet port.

* * * * *